United States Patent
Fujiwara et al.

(10) Patent No.: US 10,537,955 B2
(45) Date of Patent: Jan. 21, 2020

(54) METHOD FOR CONTROLLING ARC WELDING AND ARC WELDING DEVICE

(71) Applicant: Panasonic Intellectual Property Management Co., Ltd., Osaka (JP)

(72) Inventors: Junji Fujiwara, Osaka (JP); Atsuhiro Kawamoto, Hyogo (JP); Masaru Kowa, Osaka (JP)

(73) Assignee: Panasonic Intellectual Property Management Co., Ltd., Osaka (JP)

(*) Notice: Subject to any disclaimer, the term of this patent is extended or adjusted under 35 U.S.C. 154(b) by 1150 days.

(21) Appl. No.: 14/220,771

(22) Filed: Mar. 20, 2014

(65) Prior Publication Data
US 2014/0203003 A1 Jul. 24, 2014

Related U.S. Application Data

(63) Continuation of application No. PCT/JP2013/000177, filed on Jan. 17, 2013.

(30) Foreign Application Priority Data

Mar. 16, 2012 (JP) ................. 2012-059774

(51) Int. Cl.
*B23K 9/09* (2006.01)
*B23K 9/12* (2006.01)
(Continued)

(52) U.S. Cl.
CPC .......... *B23K 9/0956* (2013.01); *B23K 9/1043* (2013.01); *B23K 9/125* (2013.01); *B23K 37/02* (2013.01)

(58) Field of Classification Search
CPC ........ B23K 9/067; B23K 9/073; B23K 9/091; B23K 9/09; B23K 9/0956; B23K 9/0738
(Continued)

(56) References Cited

U.S. PATENT DOCUMENTS 6,627,850 B1 9/2003 Koga et al.
2005/0023261 A1 2/2005 Zheng et al.
(Continued)

FOREIGN PATENT DOCUMENTS

CN 1344192 4/2002
CN 101204753 6/2008
(Continued)

OTHER PUBLICATIONS

International Search Report for PCT/JP2013/000177 dated Mar. 12, 2013.
(Continued)

*Primary Examiner* — Tu B Hoang
*Assistant Examiner* — Alba T Rosario-Aponte
(74) *Attorney, Agent, or Firm* — Wenderoth, Lind & Ponack, L.L.P.

(57) ABSTRACT

Disclosed is a method for controlling arc welding where an arc is generated between a welding wire as a consumable electrode and an object to be welded. The method includes: keeping a wire feed speed at a predetermined constant speed in a steady-state welding period; and at a time point when welding termination is ordered, either switching the wire feed speed from the predetermined constant speed to a wire feed speed at which the welding wire is fed in alternating forward and backward directions, or decreasing the wire feed speed from the predetermined constant speed with time, and then switching the wire feed speed to the wire feed speed at which the welding wire is fed in alternating forward and backward directions at a time point when a predetermined time period has passed since when welding termination was ordered.

9 Claims, 10 Drawing Sheets (51) Int. Cl.
    *B23K 9/073*      (2006.01)
    *B23K 9/095*      (2006.01)
    *B23K 9/067*      (2006.01)
    *B23K 103/02*      (2006.01)
    *B23K 103/04*      (2006.01)
    *B23K 103/10*      (2006.01)
    *B23K 9/10*      (2006.01)
    *B23K 37/02*      (2006.01)
    *B23K 9/173*      (2006.01)

(58) Field of Classification Search
    USPC ...... 219/125.1, 130.1–130.51, 137 R, 137.2,
                                                  219/137.71
    See application file for complete search history.

(56) References Cited

U.S. PATENT DOCUMENTS

| | | | |
|---|---|---|---|
| 2008/0149606 A1 | 6/2008 | Uezono | |
| 2008/0169276 A1* | 7/2008 | Mukai | B23K 9/0671 219/124.01 |
| 2008/0314884 A1* | 12/2008 | Fujiwara | B23K 9/0735 219/130.51 |
| 2009/0114631 A1* | 5/2009 | Chevalier | B23K 9/124 219/137.7 |
| 2012/0074114 A1* | 3/2012 | Kawamoto | B23K 9/0731 219/130.21 |
| 2012/0097654 A1 | 4/2012 | Kawamoto et al. | |
| 2012/0145690 A1 | 6/2012 | Kawamoto et al. | |
| 2012/0145691 A1* | 6/2012 | Fujiwara | B23K 9/073 219/130.31 |
| 2014/0203003 A1 | 7/2014 | Fujiwara et al. | |

FOREIGN PATENT DOCUMENTS

| | | | |
|---|---|---|---|
| CN | 102264500 | 11/2011 | |
| CN | 102371415 | 3/2012 | |
| CN | 103974799 | 7/2017 | |
| EP | 2338628 A1 * | 6/2011 | ............. B23K 9/073 |
| EP | 2402105 A1 * | 1/2012 | ............. B23K 9/067 |
| JP | 01-107968 A | 4/1989 | |
| JP | 03-094978 A | 4/1991 | |
| JP | 5-42369 | 2/1993 | |
| JP | 2001-001143 A | 1/2001 | |
| JP | 2005-279739 | 10/2005 | |
| JP | 2007-275995 A | 10/2007 | |
| JP | 2011-056589 A | 3/2011 | |
| WO | 20111004586 A1 | 1/2011 | |
| WO | 2011/024380 | 3/2011 | |
| WO | 20111024380 A1 | 3/2011 | |

OTHER PUBLICATIONS

English Translation of Chinese Search Report dated Jul. 27, 2015 for the related Chinese Patent Application No. 201380003930.6.
European Search Report dated Nov. 16, 2015 in European Patent Application No. 13761257.8.
English Translation of Search Report dated Oct. 31, 2018 in Chinese Application No. 201710455172.1.

\* cited by examiner

METHOD FOR CONTROLLING ARC WELDING AND ARC WELDING DEVICE

BACKGROUND

1. Technical Field

The present invention relates to a method for controlling arc welding in a welding end period when arc welding is performed while continuously feeding a welding wire as a consumable electrode, and also relates to an arc welding device.

2. Background Art

In consumable electrode arc welding, welding is ended by stopping the supply of welding output voltage and the feed of the welding wire.

Figure 10:
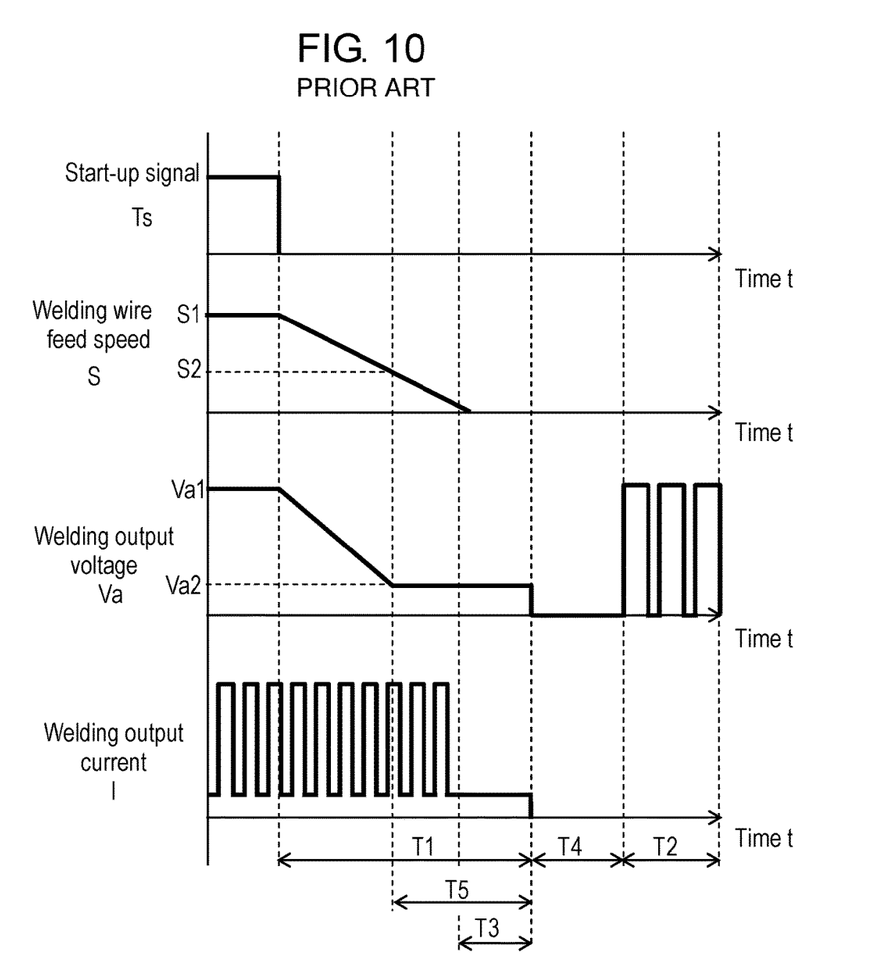
FIG. 10 shows an example of a conventional method for controlling welding.

FIG. 10 shows an example of a conventional method for controlling welding. In the example of FIG. 10, consumable electrode pulsed arc welding is controlled with an arc welding device. In FIG. 10, TS represents a start-up signal, S represents a welding wire feed speed, S1 represents a welding wire feed speed in a steady-state welding period, and S2 represents a predetermined welding wire feed speed. Furthermore, T1 represents a first end-of-welding control period, T2 represents a second end-of-welding control period, T3 represents a peak current output prohibition period, T4 represents a welding output voltage outage period, and T5 represents a predetermined period. Va represents a welding output voltage, Va1 represents a welding output voltage in the steady-state welding period, Vat represents a predetermined welding output voltage, and I represents a welding output current. FIG. 10 shows the time waveforms of the start-up signal TS, the welding wire feed speed S, the welding output voltage Va, and the welding output current I starting from the top of the graph.

When the start-up signal TS is turned off to terminate the welding, the welding wire feed speed S starts to decrease. The welding wire feed speed S can be detected, for example, with a non-contact optical speed sensor. In this case, the welding wire feed speed S can be set as a function of a number of revolutions of a welding-wire feed motor which is detected. The number of revolutions of the welding-wire feed motor can be detected with at least one of an encoder, a contact tachometer, and a non-contact optical speed sensor. Alternatively, the number of revolutions of the welding-wire feed motor can be set as a function of a reverse voltage of the welding-wire feed motor which is detected. The welding output voltage Va is set as a function of the welding wire feed speed S. The function used here monotonically decreases with a decrease in the welding wire feed speed S.

The welding output voltage Va to be set may be a welding output voltage at which the welding wire feed speed S can be most stabilized in the steady-state welding period. Thus, in a welding end period, the welding output voltage Va can be applied in accordance with the welding wire feed speed S. As a result, even if the rate of decrease of the welding wire feed speed S has variations due, for example, to the variations of the number of revolutions of the welding-wire feed motor, welding can properly come to an end (see Japanese Unexamined Patent Publication 2007-275995).

As described above, the conventional method for controlling arc welding in a welding end period can easily control the droplet at the tip of the wire to have an appropriate size in a welding end period. This reduces the generation of spatter in a welding end period, thereby improving the finished weld quality. This conventional method also improves the arc start performance in a next welding start period so as to prevent sticking or adhesion between the welding wire and an object to be welded (also called "base material"), thereby improving welding activity.

The above-described conventional method for controlling arc welding can easily control the droplet at the tip of the wire to have an appropriate size in a welding end period, and can also improve the arc start performance in a next welding start period. However, when pulse welding is terminated, the high heat input to an object to be welded makes a welded portion (hereinafter, crater portion) large, causing a large recess to be left. Some welded products may be shipped with such a large recess remains untreated without being applied with an after-treatment which is an operation to mend such a large recess. In such cases, the values of the welded products may be badly damaged if, for example, cracks occur due to stress concentration.

To reduce a large crater portion and to mend a large recess, heat input to an object to be welded can be reduced by lowering the welding voltage. However, too low a welding voltage can cause a short circuit even during pulse welding. A short circuit is more likely to occur with lowering welding voltage, resulting in another problem of increased spatter.

Thus, it is not easy to achieve low spatter, a small crater portion, and a recess-free crater portion all together at the end of pulse welding.

SUMMARY

The present invention is directed to provide a method for controlling arc welding which achieves low spatter, a small crater portion, and a recess-free crater portion, and also to provide an arc welding device.

The method for controlling arc welding according to the present invention controls arc welding where an arc is generated between a welding wire as a consumable electrode and an object to be welded. The method for controlling arc welding according to the present invention keeps a wire feed speed at a predetermined constant speed in a steady-state welding period; and at a time point when welding termination is ordered, switches the wire feed speed from the predetermined constant speed to a wire feed speed at which the welding wire is fed in alternating forward and backward directions. Alternatively, the method for controlling arc welding according to the present invention decreases the wire feed speed from the predetermined constant speed with time. This method then switches the wire feed speed to the wire feed speed at which the welding wire is fed in alternating forward and backward directions at a time point when a predetermined period has passed since when the welding termination was ordered.

This method achieves low spatter, a small crater portion, and a recess-free crater portion, thereby eliminating an after-treatment which is an operation to mend a large recess, or reducing the time required for the after-treatment. This results in a reduction of the number of products shipped with a large recess remain untreated.

The method for controlling arc welding according to the present invention controls arc welding where an arc is generated between a welding wire as a consumable electrode and an object to be welded. The method for controlling arc welding according to the present invention keeps a wire feed speed at a predetermined constant speed in a steady-state welding period. The method for controlling arc welding according to the present invention switches the wire feed speed from the predetermined constant speed to a wire feed speed at which the welding wire is fed in alternating forward and backward directions at a time point when a crater treatment is ordered to perform welding at a lower welding current than in the steady-state welding period. The method for controlling arc welding according to the present invention switches the wire feed speed to the wire feed speed at which the welding wire is fed in alternating forward and backward directions at a time point when a predetermined time period has passed since when the crater treatment was ordered.

This method achieves low spatter, a small crater portion, and a recess-free crater portion, thereby eliminating an after-treatment which is an operation to mend a large recess, or reducing the time required for the after-treatment. This results in a reduction of the number of products shipped with a large recess remain untreated.

The arc welding device of the present invention performs welding by alternating generation of an arc and a short circuit between a welding wire as a consumable electrode and an object to be welded. The arc welding device of the present invention includes a switching unit for controlling a welding output, a drive unit for controlling the switching unit, a welding current detector for detecting a welding current, and a welding voltage detector for detecting a welding voltage. The arc welding device of the present invention further includes a short-circuit/arc detector, a short-circuit controller, an arc controller, a wire feed speed controller, a welding condition setting unit, an end-of-welding ordering unit, and a crater treatment ordering unit. The short-circuit/arc detector detects whether the welding is in a short-circuit state or in an arc state based on at least one of the output of the welding voltage detector and the output of the welding current detector. The short-circuit controller outputs a welding-output control signal for a short-circuit period to the drive unit upon receiving a signal indicating that the welding is in the short-circuit state from the short-circuit/arc detector. The arc controller outputs a welding-output control signal for an arc period to the drive unit upon receiving a signal indicating that the welding is in the arc state from the short-circuit/arc detector. The wire feed speed controller controls a wire feed speed based on the output of the short-circuit/arc detector. The welding condition setting unit sets welding conditions including programmed current and programmed voltage. The end-of-welding ordering unit orders termination of welding. The crater treatment ordering unit orders performance of a welding crater treatment. In the steady-state welding period, the wire feed speed controller controls the wire feed speed to be a predetermined constant speed, and either at a time point when welding termination is ordered or at a time point when a crater treatment is ordered, the wire feed speed controller switches the wire feed speed from the predetermined constant speed to a wire feed speed at which the welding wire is fed in alternating forward and backward directions. Alternatively, at the time point when the welding termination is ordered, the wire feed speed controller controls the wire feed speed to decrease with time from the predetermined constant speed, and at a time point when a predetermined time period has passed since when the time point when the welding termination was ordered, the wire feed speed controller switches the wire feed speed to the wire feed speed at which the welding wire is fed in alternating forward and backward directions.

This configuration achieves low spatter, a small crater portion, and a recess-free crater portion, thereby eliminating an after-treatment which is an operation to mend a large recess, or reducing the time required for the after-treatment. This results in a reduction of the number of products shipped with a large recess remain untreated.

Thus, according to the present invention, the occurrence of weld defects in the crater portion can be prevented at a production site, thereby improving production efficiency and weld quality.

DESCRIPTION OF EMBODIMENT

An exemplary embodiment of the present invention will be described with reference to the accompanying drawings. In these drawings, the same components are denoted by the same reference numerals, and the description thereof may be omitted.

First Exemplary Embodiment

Figure 1:
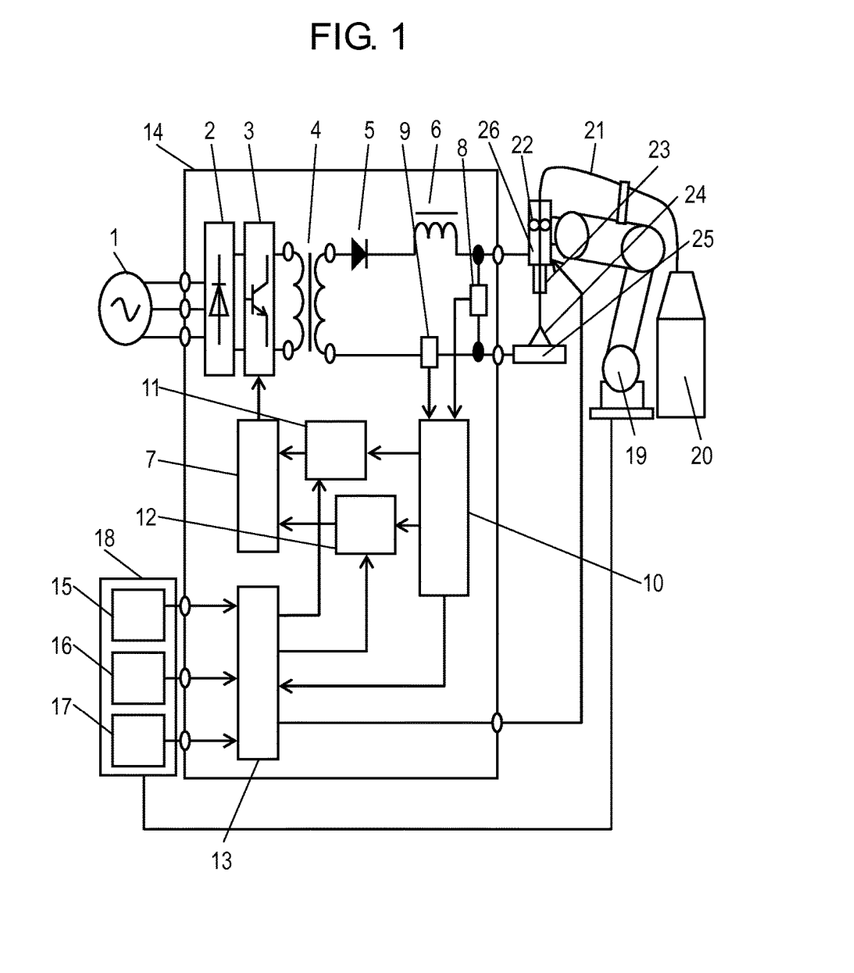
FIG. 1 shows a schematic configuration of an arc welding device according to a first exemplary embodiment of the present invention.
Figure 2:
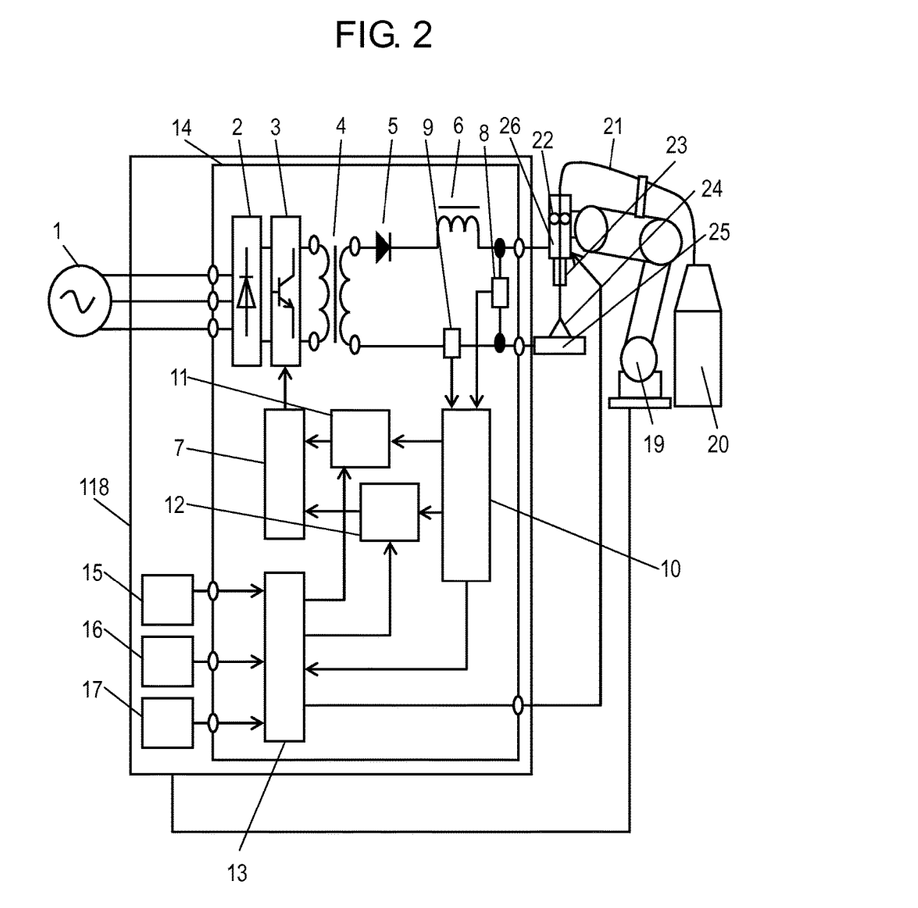
FIG. 2 shows a schematic configuration of the arc welding device according to the first exemplary embodiment of the present invention.

FIGS. 1 and 2 show schematic configurations of an arc welding device according to a first exemplary embodiment of the present invention. A schematic configuration of the arc welding device according to the present exemplary embodiment 1 will now be described with reference to FIG. 1.

As shown in FIG. 1, the arc welding device of the present exemplary embodiment 1 includes primary rectifier 2, switching unit 3, transformer 4, secondary rectifier 5 with DCL 6, drive unit 7, welding voltage detector 8, welding current detector 9, short-circuit/arc detector 10, short-circuit controller 11, arc controller 12, and wire feed speed controller 13. Primary rectifier 2 rectifies the power received from input power 1. Switching unit 3 converts the output of primary rectifier 2 to AC. Transformer 4 transforms the output of switching unit 3. Secondary rectifier 5 and DCL 6 rectify the output of transformer 4. Drive unit 7 controls switching unit 3. Welding voltage detector 8 detects a welding voltage. Welding current detector 9 detects a welding current. Short-circuit/arc detector 10 detects whether the welding is in a short-circuit state or in an arc state based on at least one of the output of welding voltage detector 8 and the output of welding current detector 9. Short-circuit controller 11 controls a welding output when the welding is in a short-circuit state. Arc controller 12 controls a welding output when the welding is in an arc state. Wire feed speed controller 13 controls the wire feed speed in accordance with a programmed current.

Welding wire 21, which is a consumable electrode stored in wire storing unit 20 is fed by wire feed motor 22. Wire 21 is supplied with electric power through tip 23 attached to welding torch 26. Between wire 21 and object 25 to be welded, welding arc 24 is generated to perform welding. Welding torch 26 is carried attached, for example, to manipulator 19, which is a component of an industrial robot.

The arc welding device of the present exemplary embodiment 1 includes, in addition to the typical components included in welding power source 14, manipulator 19 of an industrial robot, and robot control device 18 to control manipulator 19. A wire feed speed in accordance with the programmed current set by welding condition setting unit 17 in robot control device 18 is sent as a speed signal from wire feed speed controller 13 to wire feed motor 22. The wire feed speed is also sent to either short-circuit controller 11 or arc controller 12 as a speed signal from wire feed speed controller 13 so as to control welding output in a short-circuit state or in an arc state. Welding condition setting unit 17 is provided to set welding conditions including programmed current and programmed voltage.

Upon receiving a short-circuit detection signal from short-circuit/arc detector 10, short-circuit controller 11 outputs a short-circuit current so as to melt the tip of wire 21, thereby accelerating the opening of a short circuit. Arc controller 12 controls to output a high current immediately after a short circuit opens, thereby forming a droplet at the tip of wire 21 while maintaining a long arc, and then to output a low current by controlling the current and voltage, thereby inducing a short circuit.

Either end-of-welding ordering unit 15 or crater treatment ordering unit 16 both of which are included in robot control device 18 sends out a signal for the termination of welding or a signal for the performance of a crater treatment. As a result, the arc welding device starts either the end-of-welding control, which indicates to provide a welding output until the feeding of wire 21 is terminated, or the crater treatment, which indicates to fill in a crater.

The arc welding device of the present exemplary embodiment 1 having the above-described configuration switches from the constant wire feed speed in the steady-state welding period to the wire feed speed at which the wire is fed in alternating forward and backward directions either in the end-of-welding period or in the crater treatment period.

The components of the arc welding device shown in FIG. 1 may be formed alone or in combination.

As described above, the arc welding device of the present exemplary embodiment 1 performs welding by alternating generation of an arc and a short circuit between welding wire 21, which is a consumable electrode and object 25 to be welded. The arc welding device of the present exemplary embodiment 1 includes switching unit 3 for controlling a welding output, drive unit 7 for controlling switching unit 3, welding current detector 9 for detecting a welding current, and welding voltage detector 8 for detecting a welding voltage. The arc welding device further includes short-circuit/arc detector 10, short-circuit controller 11, arc controller 12, wire feed speed controller 13, welding condition setting unit 17, end-of-welding ordering unit 15, and crater treatment ordering unit 16. Short-circuit/arc detector 10 detects whether the welding is in a short-circuit state or in an arc state based on at least one of the output of welding voltage detector 8 and the output of welding current detector 9. Short-circuit controller 11 outputs a welding-output control signal for a short-circuit period to drive unit 7 upon receiving a signal indicating that the welding is in a short-circuit state from short-circuit/arc detector 10. Arc controller 12 outputs a welding-output control signal for an arc period to drive unit 7 upon receiving a signal indicating that the welding is in an arc state from short-circuit/arc detector 10. Wire feed speed controller 13 controls the wire feed speed based on the output of short-circuit/arc detector 10. Welding condition setting unit 17 sets welding conditions including programmed current and programmed voltage. End-of-welding ordering unit 15 orders the termination of welding. Crater treatment ordering unit 16 orders the performance of a crater treatment. Wire feed speed controller 13 controls the wire feed speed to be a predetermined constant speed in a steady-state welding period. Wire feed speed controller 13 then switches the wire feed speed from the predetermined constant speed to a wire feed speed at which the wire is fed in alternating forward and backward directions either at the time point when welding termination is ordered or at the time point when a crater treatment is ordered. Alternatively, wire feed speed controller 13 controls the wire feed speed to decrease with time from the predetermined constant speed at the time point when the welding termination is ordered, and then switches to the wire feed speed at which the wire is fed in alternating forward and backward directions at the time point when a predetermined time period has passed since when the welding termination was ordered.

This configuration achieves low spatter, a small crater portion, and a recess-free crater portion, thereby eliminating an after-treatment which is an operation to mend a large recess, or reducing the time required for the after-treatment. This results in a reduction of the number of products shipped with a large recess remain untreated.

The arc welding device of the present exemplary embodiment 1 further includes an industrial robot including manipulator 19 and robot control device 18 to control the operation of manipulator 19, and welding power source 14. The industrial robot includes welding condition setting unit 17, end-of-welding ordering unit 15, and crater treatment ordering unit 16. Welding power source 14 may include switching unit 3, drive unit 7, welding current detector 9, welding voltage detector 8, short-circuit/arc detector 10, short-circuit controller 11, arc controller 12, and wire feed speed controller 13.

In this configuration, the arc welding device can be compact because it only includes the industrial robot and welding power source 14, thereby achieving low spatter, a small crater portion, and a recess-free crater portion.

As shown in FIG. 2, welding power source 14 may be disposed in robot control device 118 to make the arc welding device more compact.

The following is a description of some examples to switch from the constant wire feed speed in a steady-state welding period to the wire feed speed at which the wire is fed in alternating forward and backward directions in an end-of-welding period.

Figure 3:
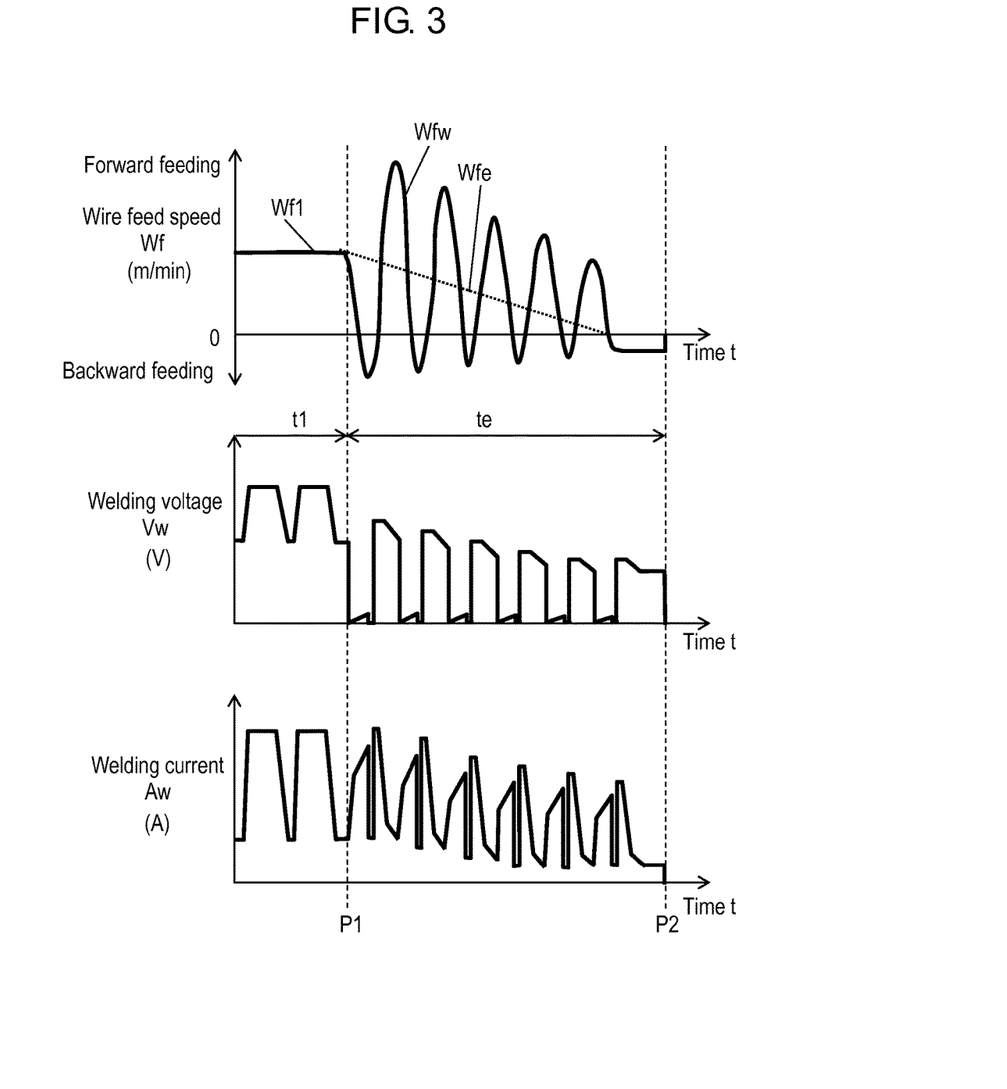
FIG. 3 shows time waveforms of a welding current, a welding voltage, and a wire feed speed in a welding end period according to the first exemplary embodiment of the present invention.

FIGS. 3 to 6 each show time waveforms of a welding current, a welding voltage, and a wire feed speed in a welding end period in the first exemplary embodiment of the present invention. Now described with reference FIG. 3 is an example where the constant wire feed speed in a steady-state welding period is switched to the wire feed speed at which the wire is fed in alternating forward and backward directions upon receiving a signal for the termination of welding.

FIG. 3 shows time waveforms of a wire feed speed Wf, a welding voltage Vw, and a welding current Aw. In a steady-state welding period t1 until a time point P1 when welding termination is ordered, a pulse welding waveform based on a constant wire feed speed Wf1 is outputted. In an end-of-welding period to lasting from the time point P1 when the welding termination is ordered until a time point P2 when the welding output is turned off, a short-circuit welding waveform is outputted based on a wire feed speed Wfw at which the wire is fed in alternating forward and backward directions and on an average feed speed Wfe so as to have the average feed speed Wfe of the wire feed speed in accordance with the programmed current.

The wire feed speed Wfw at which the wire is fed in alternating forward and backward directions can be a periodically changing wire feed speed at which the wire is fed in alternating forward and backward directions at a predetermined frequency and at a predetermined velocity amplitude in accordance with a predetermined programmed current. Alternatively, the wire feed speed Wfw can be a wire feed speed at which the wire is fed in forward and backward directions depending on a welding phenomenon. For example, the wire can be fed in a backward direction when the welding is determined to be in a short-circuit state, and in a forward direction when the welding is determined to be in an arc state. Either of these wire feed speeds may be used to control arc welding. The periodic waveform of the wire feed speed may be any waveform such as rectangular, trapezoidal, or sinusoidal. The programmed current corresponds to a commanded average wire feed speed. This means that at least one of the predetermined frequency and the predetermined velocity amplitude changes with a predetermined commanded average wire feed speed.

In the above-described control methods both using the wire feed speed Wfw at which the wire is fed in alternating forward and backward directions, each parameter related to the average feed speed Wfe of the wire feed speed in accordance with the programmed current is stored in wire feed speed controller 13. Wire feed speed controller 13 includes, as a database, a table or a relational expression in which a plurality of wire feed speeds in accordance with programmed currents are associated with each parameter.

FIG. 3 shows an example where the welding is determined to be in a short-circuit state at the time point P1 when welding termination is ordered and when the constant wire feed speed Wf1 in a steady-state welding period is switched to the wire feed speed Wfw at which the wire is fed in alternating forward and backward directions. The waveform alternating in the forward and backward directions shows the wire feed speed Wfw that is at first decreased in the forward direction toward the backward direction.

Figure 4:
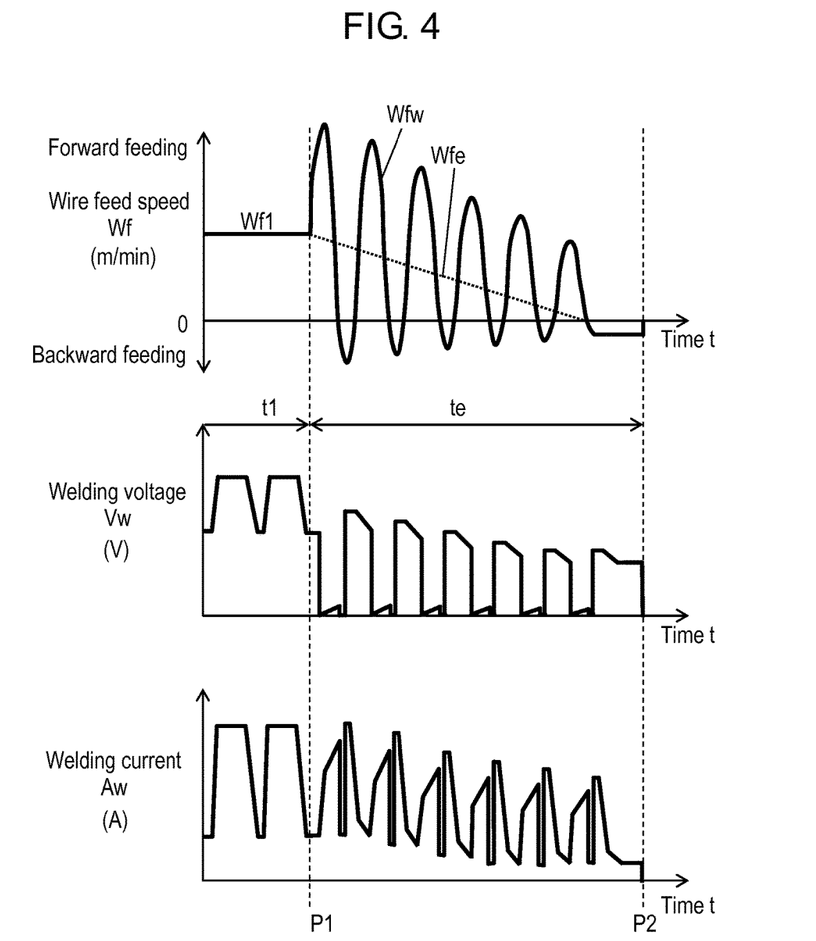
FIG. 4 shows time waveforms of a welding current, a welding voltage, and a wire feed speed in a welding end period according to the first exemplary embodiment of the present invention.

FIG. 4 shows an example where the welding is determined to be in an arc state at the time point P1 when welding termination is ordered and when the constant wire feed speed Wf1 in a steady-state welding period is switched to the wire feed speed Wfw at which the wire is fed in alternating forward and backward directions. The waveform alternating in the forward and backward directions shows the wire feed speed Wfw that is at first increased in the forward direction.

If wire 21 is fed in the forward direction when the welding is determined to be in a short-circuit state, it becomes harder to open a short circuit. On the other hand, if wire 21 is fed in the backward direction when the welding is determined to be in an arc state, the arc length becomes larger, making it impossible to generate a short circuit, thereby making welding arc 24 unstable. Hence, it is crucial to determine whether the wire feed speed Wfw at which the wire is fed in alternating forward and backward directions should be at first increased in the forward direction or at first decreased in the forward direction, depending on the state of welding at the time point P1 when welding termination is ordered.

Figure 5:
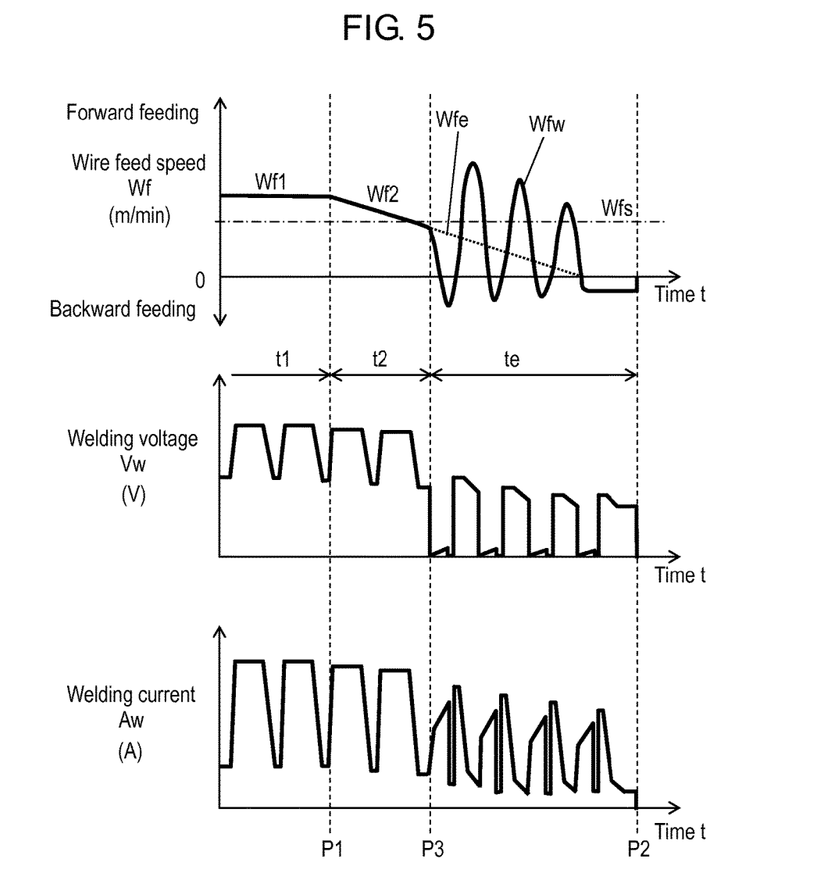
FIG. 5 shows time waveforms of a welding current, a welding voltage, and a wire feed speed in a welding end period according to the first exemplary embodiment of the present invention.

FIG. 5 shows an example where at a time point P3 which is later than the time point P1 when welding termination is ordered, the constant wire feed speed Wf1 in a steady-state welding period is switched to the wire feed speed Wfw at which the wire is fed in alternating forward and backward directions. In the period after the time point P1 when the welding termination is ordered and until the time point P3 later than the time point when the welding termination is ordered, the wire feed speed is controlled to become a wire feed speed Wf2 which decreases with time from the constant wire feed speed Wf1 in the steady-state welding period. In the period after the time point P3 and until the time point P2 when the welding output is turned off, the wire feed speed Wf2 is controlled to be switched to the wire feed speed Wfw at which the wire is fed in alternating forward and backward directions.

The time point P3 later than the time point when welding termination is ordered can be a time point when an end-of-welding period t2 after the welding termination is ordered has passed since the time point P1 when the welding termination was ordered. Alternatively, the time point P3 can be a time point when the wire feed speed that decreases with time from the time point P1 when the welding termination is ordered falls below a predetermined threshold Wfs of the wire feed speed.

The control method shown in FIG. 5 can be used when a programmed current is in the high current region (for example, 300 A or more). More specifically, this control method is often used when the wire feed speed Wf1 in the steady-state welding period is as high as 10 m/min or more. If the wire is fed in alternating forward and backward directions at a high wire feed speed, the wire feed device may be influenced or welding may become unstable. For such reasons, in the case where the wire feed speed is high, it may be advantageous to use the control method shown in FIG. 5 depending on the welding method, the wire diameter, or other conditions.

Wire feed speed controller 13 includes, as a database, a table or a relational expression in which a plurality of wire feed speeds in accordance with programmed currents are associated either with the end-of-welding period t2 after welding termination is ordered, or with the predetermined threshold Wfs of the wire feed speed.

Figure 6:
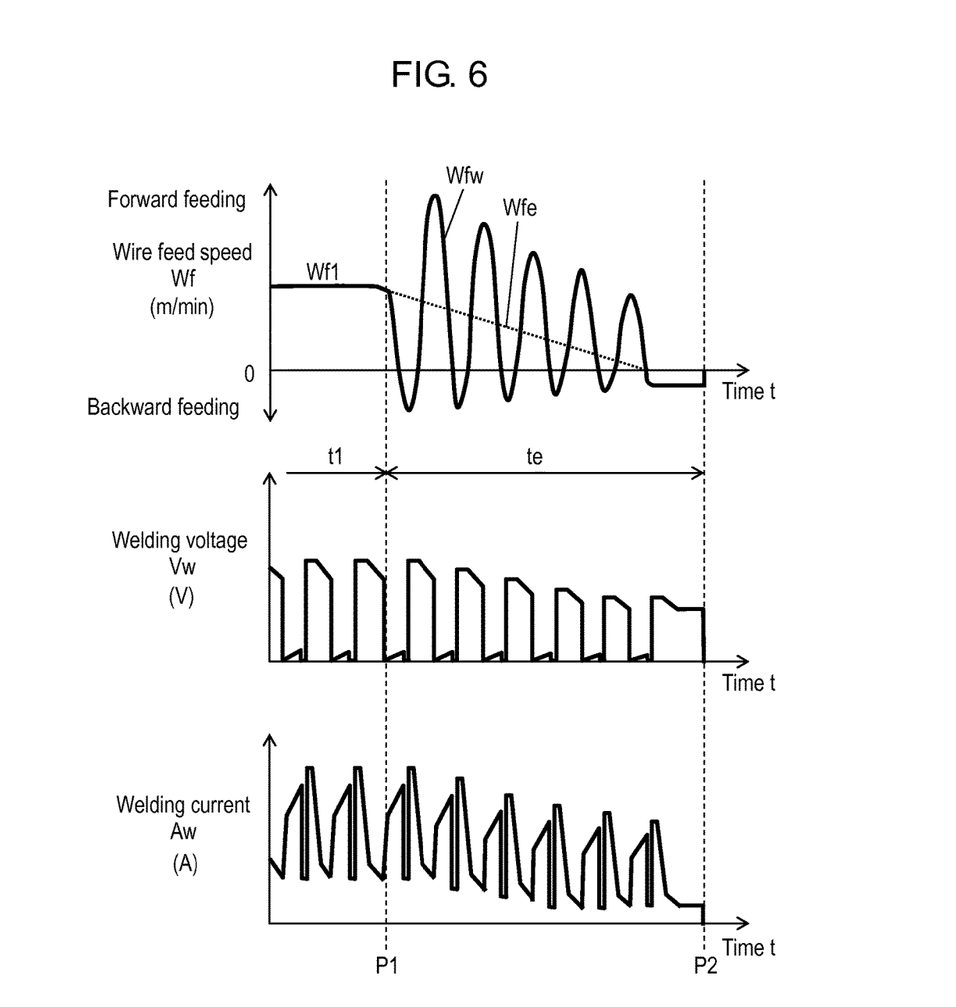
FIG. 6 shows time waveforms of a welding current, a welding voltage, and a wire feed speed in a welding end period according to the first exemplary embodiment of the present invention.

FIG. 6 shows an example where the welding method in a steady-state welding period until the time point P1 when welding termination is ordered is short-circuit welding. Similar to the case of pulse welding, when the welding is determined to be in a short-circuit state at the time point P1, the wire feed speed Wfw at which the wire is fed in alternating forward and backward directions is at first decreased in the forward direction. As described above, the time point P1 is a time point when welding termination is ordered and when the constant wire feed speed Wf1 in the steady-state welding period is switched to the wire feed speed Wfw at which the wire is fed in alternating forward and backward directions. Although not illustrated, in the case where the welding is determined to be in an arc state at a time point to switch the wire feed speed, the wire feed speed can be at first increased in the forward direction. Similar to the case of FIG. 5, the wire feed speed can be switched to the wire feed speed Wfw at which the wire is fed in alternating forward and backward directions either at the time point when the end-of-welding period t2 has passed since when the welding termination was ordered, or at the time point when the wire feed speed falls below the predetermined threshold Wfs of the wire feed speed.

Thus, the method for controlling arc welding according to the present exemplary embodiment 1 controls arc welding where an arc is generated between a welding wire 21 as a consumable electrode and an object 25 to be welded. The method for controlling arc welding according to the present exemplary embodiment 1 keeps a wire feed speed at a predetermined constant speed in a steady-state welding period; and at a time point when welding termination is ordered, switches the wire feed speed from the predetermined constant speed to a wire feed speed at which the welding wire is fed in alternating forward and backward directions. Alternatively, the method for controlling arc welding according to the present exemplary embodiment 1 decreases the wire feed speed from the predetermined constant speed with time, and then switches the wire feed speed to the wire feed speed at which the welding wire is fed in alternating forward and backward directions at a time point when a predetermined time period has passed since when the welding termination was ordered.

This method achieves low spatter, a small crater portion, and a recess-free crater portion, thereby eliminating an after-treatment which is an operation to mend a large recess, or reducing the time required for the after-treatment. This results in a reduction of the number of products shipped with a large recess remain untreated.

At the time point when the wire feed speed is switched to the wire feed speed at which the wire is fed in alternating forward and backward directions, if the welding is in a short-circuit state, the feeding of the wire in alternating forward and backward directions may be started in the backward direction. Alternatively, the feeding of the wire in alternating forward and backward directions may be at first decelerated in the forward direction. If the welding is in an arc state, the feeding of the wire in alternating forward and backward directions may be at first accelerated in the forward direction. This method achieves low spatter, a small crater portion, and a recess-free crater portion.

The wire feed speed at which the welding wire is fed in alternating forward and backward directions may be changed periodically. This method achieves low spatter, a small crater portion, and a recess-free crater portion.

When the welding wire is fed in alternating forward and backward directions at the wire feed speed periodically changing at a predetermined frequency and at a predetermined velocity amplitude, at least one of the predetermined frequency and the predetermined velocity amplitude may be changed with a predetermined commanded average wire feed speed. This method achieves low spatter, a small crater portion, and a recess-free crater portion.

The wire feed speed at which the welding wire is fed in alternating forward and backward directions may not be changed periodically, but may be changed between in a backward direction when the welding is detected to be in a short-circuit state and in a forward direction when the welding is detected to be in an arc state. This method achieves low spatter, a small crater portion, and a recess-free crater portion.

In the steady-state welding period, pulse welding may be performed. This method achieves low spatter, a small crater portion, and a recess-free crater portion.

In the steady-state welding period, short-circuit welding may be performed. This method achieves low spatter, a small crater portion, and a recess-free crater portion.

Figure 7:
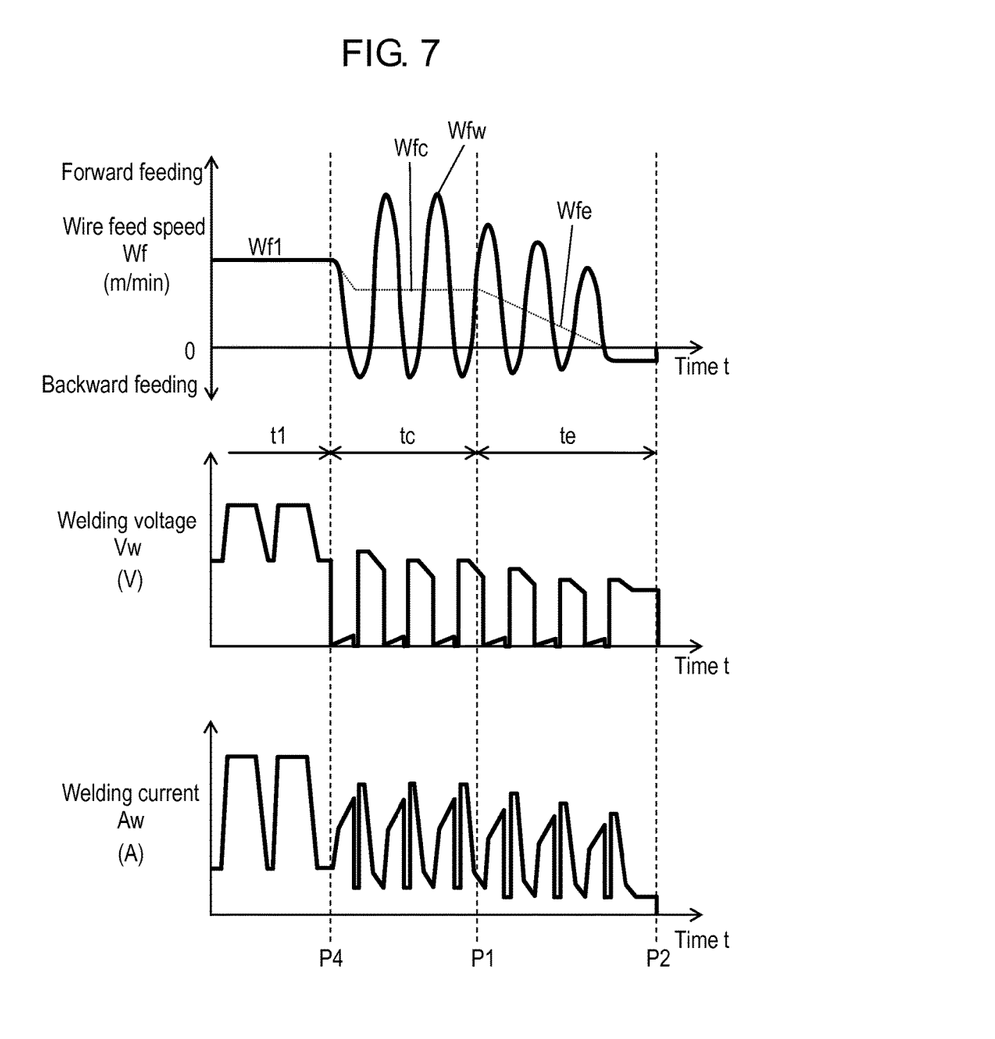
FIG. 7 shows time waveforms of a welding current, a welding voltage, and a wire feed speed in the crater treatment period and in a welding end period according to the first exemplary embodiment of the present invention.
Figure 8:
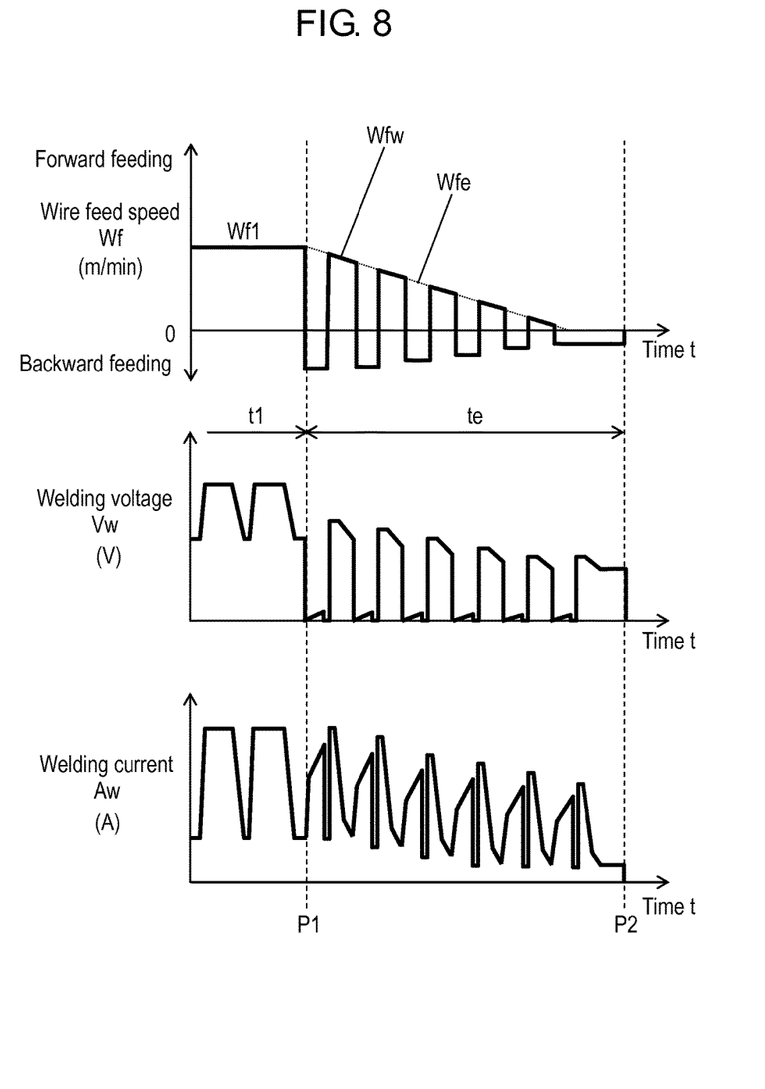
FIG. 8 shows time waveforms of a welding current, a welding voltage, and a wire feed speed in a welding end period according to the first exemplary embodiment of the present invention.
Figure 9:
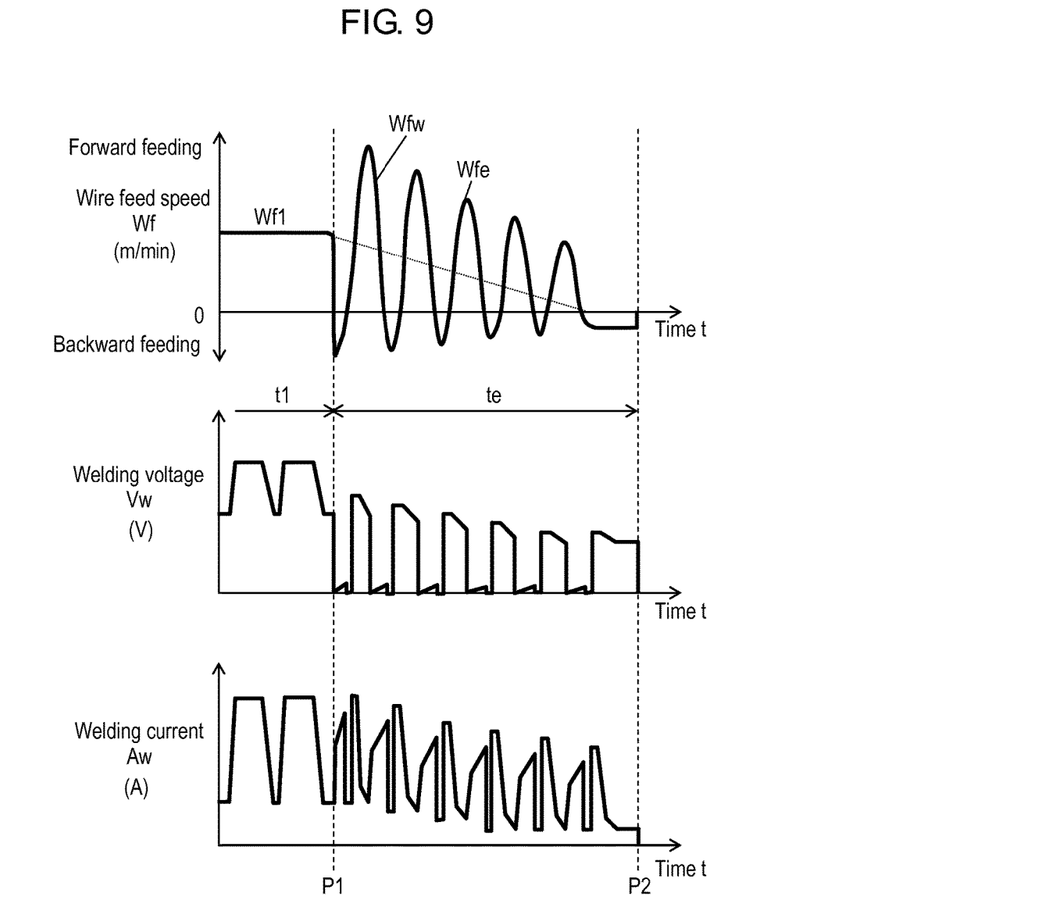
FIG. 9 shows time waveforms of a welding current, a welding voltage, and a wire feed speed in a welding end period according to the first exemplary embodiment of the present invention.

FIG. 7 shows time waveforms of a welding current, a welding voltage, and a wire feed speed in the crater treatment period and in the welding end period according to the first exemplary embodiment of the present invention. FIGS. 8 and 9 each show time waveforms of a welding current, a welding voltage, and a wire feed speed in a welding end period according to the first exemplary embodiment of the present invention.

FIG. 7 shows an example where at a time point P4 when a crater treatment is ordered, the constant wire feed speed Wf1 in a steady-state welding period is switched to the wire feed speed Wfw at which the wire is fed in alternating forward and backward directions.

The period lasting from the time point P4 until the time point P1 when welding termination is ordered is a crater treatment period tc set as a crater treatment. In the crater treatment period tc, the wire is fed in alternating forward and backward directions at the wire feed speed Wfw based on an average feed speed Wfc of wire feed control in accordance with the programmed current set for the crater treatment. From the time point P1 when the crater treatment period tc passes and when welding termination is ordered, as described above, the wire is fed in alternating forward and backward directions at the wire feed speed Wfw, based on the average feed speed Wfe of the wire feed speed in accordance with the programmed current as shown in FIG. 7.

Similar to the case where welding termination is ordered, in the case where a crater treatment is ordered, if the welding is determined to be in a short-circuit state at the time point when the constant wire feed speed Wf1 in the steady-state welding period is switched to the wire feed speed Wfw at which the wire is fed in alternating forward and backward directions, the wire feed speed Wfw at which the wire is fed in alternating forward and backward directions is at first decreased in the forward direction. On the other hand, if the welding is determined to be in an arc state, the wire feed speed Wfw at which the wire is fed in alternating forward and backward directions can be at first increased in the forward direction.

Although not illustrated, similar to the example of FIG. 5, the wire feed speed can be switched to the wire feed speed Wfw at which the wire is fed in alternating forward and backward directions either at a certain time point after a crater treatment is ordered or at the time point when the wire feed speed falls below a predetermined threshold of the wire feed speed.

The switching from the constant wire feed speed in the steady-state welding period to the wire feed speed at which the wire is fed in alternating forward and backward directions is preferably performed at the time point when a crater treatment is ordered than at the time point P1 when welding termination is ordered. The reason for this is that in the former case, short-circuit welding with low heat input lasts longer, thereby reducing the crater portion in size and easily diminishing the recess.

The present exemplary embodiment 1 has described the example where the wire feed speed is switched from the constant wire feed speed Wf1 in the steady-state welding period to the wire feed speed Wfw at which the wire is fed in alternating forward and backward directions either at the time point P1 when welding termination is ordered or at the time point P4 when a crater treatment is ordered. On the other hand, in the case where the constant wire feed speed is general, the size reduction of the crater portion and the elimination of the recess can be achieved by switching pulse welding to short-circuit welding. However, this inevitably causes an increase in the amount of spatter. This is because simply performing short-circuit welding may not smoothly open a short circuit, thus possibly failing to stabilize a short-circuit cycle.

In the present exemplary embodiment 1, a short circuit can be mechanically opened by feeding the wire in the backward direction in a short circuit period at a wire feed speed at which the wire is fed in the backward direction in a short circuit period and is fed in the forward direction in an arc period. As a result, a short circuit can be opened smoothly, thus stabilizing the short-circuit cycle. Furthermore, this requires a low current to open a short circuit, eliminating the need to form excessive molten metal at the tip of the wire. This reduces the cause of spatter, and hence its production.

The method for controlling arc welding according to the present exemplary embodiment 1 controls arc welding where an arc is generated between welding wire 21 as a consumable electrode and object 25 to be welded. The method for controlling arc welding according to the present exemplary embodiment 1 keeps a wire feed speed at a predetermined constant speed in a steady-state welding period. The method for controlling arc welding according to the present exemplary embodiment 1 switches the wire feed speed from the predetermined constant speed to a wire feed speed at which the welding wire is fed in alternating forward and backward directions at a time point when a crater treatment is ordered to perform welding at a lower welding current than in the steady-state welding period. Alternatively, the method for controlling arc welding according to the present exemplary embodiment 1 switches the wire feed speed to the wire feed speed at which the welding wire is fed in alternating forward and backward directions at a time point when a predetermined time period has passed since when the crater treatment was ordered.

This method achieves low spatter, a small crater portion, and a recess-free crater portion, thereby eliminating an after-treatment which is an operation to mend a large recess, or reducing the time required for the after-treatment. This results in a reduction of the number of products shipped with a large recess remain untreated.

The present exemplary embodiment 1 is applicable to all welding methods including mild steel MAG welding, stainless MIG welding, and aluminum MIG welding.

The present exemplary embodiment 1 shows, with reference to FIGS. 1 to 7, the examples where the wire is fed in periodically alternating forward and backward directions at a predetermined frequency and at a predetermined velocity amplitude as wire feed control to alternate wire feeding in the forward and backward directions. Alternatively, however, the wire can be fed in forward and backward directions depending on the state of welding. For example, the wire can be fed in a backward direction when the welding is in a short-circuit state, and in a forward direction when the welding is in an arc state in a repeated manner as shown in FIG. 8.

With reference to FIGS. 1 to 7, the present exemplary embodiment 1 shows, as wire feed control to periodically alternate wire feeding in the forward and backward directions, the examples where if the welding is in a short-circuit state at the time point when the wire is started to be fed in alternating forward and backward directions, the feeding of the wire in periodically alternating forward and backward directions is at first decelerated in the forward direction. Alternatively, however, the feeding of the wire in periodically alternating forward and backward directions may be started in the backward direction as shown in FIG. 9 at the time point when the wire is started to be fed in alternating forward and backward directions.

This method achieves low spatter, a small crater portion, and a recess-free crater portion, thereby eliminating an after-treatment which is an operation to mend a large recess, or reducing the time required for the after-treatment. This results in a reduction of the number of products shipped with a large recess remain untreated.

Thus, the occurrence of weld defects in the crater portion can be suppressed at a production site, thereby improving production efficiency and weld quality.

According to the present invention, the occurrence of weld defects can be prevented at a production site, thereby improving production efficiency and weld quality. The method for controlling arc welding and the arc welding device according to the present invention where arc welding is performed while continuously feeding a welding wire as a consumable electrode provide high industrial applicability.

What is claimed is:

1. A method for controlling arc welding where an arc is generated between a welding wire as a consumable electrode and an object to be welded, the method comprising:
controlling a wire feeding speed for feeding the welding wire with a wire feeding speed controller;
keeping the wire feeding speed at a predetermined constant speed in a steady-state welding period, with the wire feeding speed controller; and
at a first time point when a welding termination is ordered:
switching the wire feed, with the wire feeding speed controller, speed from the predetermined constant speed to a wire feed speed at which the welding wire is fed in alternately repeating forward and backward directions, wherein in an end-of-welding period lasting from the first time point when the welding termination is ordered until a second time point at which the welding output is turned off, an average feed speed of the wire feed speed at which the welding wire is fed in alternately repeating forward and backward directions decreases, until it stops, while the welding wire is fed a plurality of times in the alternately repeating the forward and the backward directions, or
decreasing the wire feed speed, with the wire feeding speed controller, from the predetermined constant speed with time, and then switching the wire feed speed to the wire feed speed at which the welding wire is fed in alternately repeating forward and backward directions at a third time point when a predetermined time period has passed from the first time point when welding termination was ordered, wherein in a period lasting from the third time point until the second time point at which the welding output is turned off, the average feed speed of the wire feed speed at which the welding wire is fed in alternately repeating forward and backward directions decreases, until it stops, while the welding wire is fed a plurality of times in the alternately repeating the forward and the backward directions.

2. The method for controlling arc welding of claim 1, wherein
at the time point when the wire feed speed when welding termination is ordered is switched to the wire feed speed at which the welding wire is fed in alternating forward and backward directions,
when the welding is in a short-circuit state,
feeding of the welding wire in alternating forward and backward directions is started in the backward direction, or
the feeding of the welding wire in alternating forward and backward directions is at first decelerated in the forward direction; and
when the welding is in an arc state,
the feeding of the welding wire in alternating forward and backward directions is at first accelerated in the forward direction.

3. The method for controlling arc welding of claim 1, wherein
the wire feed speed at which the welding wire is fed in alternating forward and backward directions is changed periodically.

4. The method for controlling arc welding of claim 3, wherein
when the welding wire is fed in alternating forward and backward directions at the wire feed speed periodically changing at a predetermined frequency and at a predetermined velocity amplitude, at least one of the predetermined frequency and the predetermined velocity amplitude is changed according to a preset commanded average wire feed speed.

5. The method for controlling arc welding of claim 1, wherein
the wire feed speed at which the welding wire is fed in alternating forward and backward directions is not changed periodically, but is changed between in a backward direction when the welding is detected to be in a short-circuit state and in a forward direction when the welding is detected to be in an arc state.

6. The method for controlling arc welding of claim 1, wherein in the steady-state welding period, pulse welding is performed.

7. The method for controlling arc welding of claim 1, wherein in the steady-state welding period, short-circuit welding is performed.

8. The method for controlling arc welding of claim 1, wherein when the average feed speed of the wire feed speed at which the welding wire is fed in alternately repeating forward and backward directions decreases until it stops with the alternately a plurality of times repeating the forward and the backward directions, a velocity amplitude of the wire feed speed attenuates with time.

9. The method for controlling arc welding of claim 1, further comprising a crater treatment period before the first time point when the welding termination is ordered, wherein welding is performed at a lower welding current than in the steady-state welding period, and wherein in the crater treatment period
the average wire feed speed is lower than the predetermined constant speed in the steady-state welding period, and
the average wire feed speed is switched to the wire feed speed at which the welding wire is fed in alternating forward and backward directions.

* * * * *